United States Patent
Perveiler (10) Patent No.: US 10,704,787 B2
(45) Date of Patent: Jul. 7, 2020

(54) CLOSED TRAPPED VORTEX CAVITY PILOT FOR A GAS TURBINE ENGINE AUGMENTOR

(71) Applicant: General Electric Company, Cincinnati, OH (US)

(72) Inventor: David Andrew Perveiler, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1033 days.

(21) Appl. No.: 15/085,165

(22) Filed: Mar. 30, 2016

(65) Prior Publication Data
US 2017/0284674 A1 Oct. 5, 2017

(51) Int. Cl.
*F23R 3/12* (2006.01)
*F23R 3/20* (2006.01)
(Continued)

(52) U.S. Cl.
CPC .......... *F23R 3/20* (2013.01); *F01D 9/02* (2013.01); *F01D 25/12* (2013.01); *F01D 25/30* (2013.01); *F02C 7/222* (2013.01); *F02C 7/264* (2013.01); *F02K 3/08* (2013.01); *F23R 3/002* (2013.01); *F23R 3/06* (2013.01); *F23R 3/283* (2013.01); *F23R 3/343* (2013.01); *F23R 3/42* (2013.01); *F05D 2220/32* (2013.01); *F05D 2240/35* (2013.01); *Y02T 50/672* (2013.01); *Y02T 50/675* (2013.01)

(58) Field of Classification Search
CPC ...... F23R 3/12; F23R 3/02; F23R 3/18; F23R 3/10
See application file for complete search history.

(56) References Cited

U.S. PATENT DOCUMENTS 5,201,181 A * 4/1993 Ohmori .................. F23R 3/34
60/737
5,396,763 A 3/1995 Mayer et al.
(Continued)

FOREIGN PATENT DOCUMENTS

| CN | 1195088 A | 10/1998 |
|---|---|---|
| CN | 101650038 A | 2/2010 |
| CN | 204254676 U | 4/2015 |

OTHER PUBLICATIONS

English translation of CN 101650038 (Year: 2010).*
(Continued)

*Primary Examiner* — Ehud Gartenberg
*Assistant Examiner* — Thomas P Burke
(74) *Attorney, Agent, or Firm* — General Electric Company; Pamela Kachur (57) ABSTRACT

A closed trapped vortex apparatus includes: a tubular structure having a structural wall, the structural wall forming a cavity within the tubular structure, the structural wall having a lower boundary wall forming a boundary between the cavity and a core flow passage; at least one driver hole passing through the structural wall; an ignition source communicating with the cavity; a fuel source communicating with the cavity; and a plurality of flame tubes extending through the lower boundary wall of the tubular structure at preselected locations so as to provide communication between the cavity and the core flow passage.

19 Claims, 8 Drawing Sheets

(51) Int. Cl.
  *F23R 3/34* (2006.01)
  *F02K 3/08* (2006.01)
  *F23R 3/28* (2006.01)
  *F01D 9/02* (2006.01)
  *F01D 25/12* (2006.01)
  *F01D 25/30* (2006.01)
  *F02C 7/22* (2006.01)
  *F02C 7/264* (2006.01)
  *F23R 3/00* (2006.01)
  *F23R 3/06* (2006.01)
  *F23R 3/42* (2006.01)

(56) References Cited

U.S. PATENT DOCUMENTS

| | | | | |
|---|---|---|---|---|
| 5,475,979 A | * | 12/1995 | Oag | F23C 6/047 60/737 |
| 5,813,221 A | | 9/1998 | Geiser et al. | |
| 6,286,298 B1 | * | 9/2001 | Burrus | F23R 3/28 60/732 |
| 7,467,518 B1 | | 12/2008 | Vermeersch | |
| 8,011,188 B2 | | 9/2011 | Woltmann et al. | |
| 8,272,219 B1 | | 9/2012 | Johnson et al. | |
| 8,726,670 B2 | * | 5/2014 | Bachman | F23R 3/18 60/766 |
| 10,082,076 B2 | * | 9/2018 | Tangirala | F02C 3/14 |
| 2002/0112482 A1 | * | 8/2002 | Johnson | F23R 3/16 60/776 |
| 2007/0044476 A1 | * | 3/2007 | Koshoffer | F23R 3/20 60/776 |
| 2009/0056340 A1 | * | 3/2009 | Woltmann | F23R 3/12 60/765 |
| 2012/0151932 A1 | * | 6/2012 | Evulet | F23R 3/20 60/772 |

OTHER PUBLICATIONS

Extended European Search Report and Opinion issued in connection with corresponding EP Application No. 17163155.9 dated Aug. 25, 2017.

Machine Translation and First Office Action and Search issued in connection with corresponding CN Application No. 201710201704.9 dated Nov. 27, 2018.

* cited by examiner

CLOSED TRAPPED VORTEX CAVITY PILOT FOR A GAS TURBINE ENGINE AUGMENTOR

BACKGROUND OF THE INVENTION

The present invention is directed to aircraft engine turbine engines with thrust augmentors, and more specifically to augmentors or afterburners with closed trapped vortex cavities.

High performance military aircraft typically include a turbofan gas turbine engine with thrust augmentors or afterburners to provide additional thrust when desired, such as when transitioning to supersonic flight. The turbofan engine includes in downstream serial flow communication, a multistage fan, a multistage compressor, a combustor, a high pressure turbine powering the compressor and a low pressure turbine powering the fan. A bypass duct surrounds and allows a portion of the fan air to bypass the multistage compressor, combustor, high pressure turbine and low pressure turbine.

During operation, air is compressed in turn through the fan and compressor and is mixed with fuel in the combustor. The fuel is ignited in the combustor, generating hot, high energy combustion gases which flow downstream through the turbine stages. The turbine stages extract energy from these combustion gases. Hot core gases exiting the turbine stages are then discharged into an exhaust section of the engine, which includes augmentor or afterburner hardware. The gases traversing the exhaust section are discharged from the engine through a variable area exhaust nozzle, the gases providing thrust which drives the aircraft.

Afterburners are located in the exhaust sections of the turbine engines. The exhaust sections include an exhaust casing and an exhaust liner circumscribing a combustion zone. Fuel injectors (such as spraybars) and flame holders are mounted between the last stage of the turbine section and the exhaust nozzle. These injectors add additional fuel into the exhaust nozzle which when ignited, provides augmented thrust that accelerates the aircraft. Thrust augmentation or reheat using such fuel injection is referred to as wet operation, while dry operation refers to unaugmented flight when the afterburners or augmentors are not actively operational.

An annular bypass duct extends from the fan to at least the augmentor, bypassing a portion of the fan air around the core engine to the afterburner. The bypass air is mixed with the core gases and fuel from the augmentor spray bars, ignited, and combusted prior to discharge through the exhaust nozzle. The bypass air is also used in part for cooling various engine components, such as, for example, the exhaust liner.

Various types of flameholders are known and provide local low velocity recirculation and stagnation regions therebehind, in regions of otherwise high velocity core gases, for sustaining and stabilizing combustion during reheat operation. Since the core gases are the product of combustion in the core engine, they are initially hot, and are further heated when burned with the bypass air and additional fuel during reheat operation. Augmentors currently are used to temporarily maximize thrust and tend to be full stream, that is consuming all available oxygen in the combustion process, yielding high augmentation ratios, for example, a ratio of about 70%.

In regions immediately downstream of the flameholder, the gas flow partially recirculates and the velocity of the gas flow is less than the rate of flame propagation. In these regions, there will be a stable flame existing that can ignite new fuel as it passes. Unfortunately, flameholders in the gas stream inherently cause flow losses and reduced engine efficiency. Several modern gas turbine engines and designs include radially extending spraybars and flameholders in an effort to improve flame stability and reduce the flow losses. Radial spraybars integrated with radial flameholders are disclosed in U.S. Pat. Nos. 5,396,763 and 5,813,221. Radial spraybars disposed between radial flameholders having integrated radial spraybars have been incorporated into the GE F414 and GE F110-132 aircraft gas turbine engines. This arrangement provides additional dispersion of the fuel for more efficient combustion and unload fueling of the radial flameholders with the integrated radial spraybars so that they do not blow out and/or have unstable combustion due to excess fueling.

Since fuel is typically injected upstream of the flameholders, undesirable auto-ignition of the fuel and combustion which might occur upstream of the flameholders causes flameholder distress, which also significantly reduces the life of the flameholders. Since V-gutter flameholders are suspended within the core gases, they are more difficult to effectively cool, and typically, experience circumferential variation in temperature, which correspondingly affects thermal stress, decreasing the useful life thereof. V-gutter flameholders have limited flameholding capability and their aerodynamic performance and characteristics negatively impact the size performance and thrust capability of the engine. This is, in part, due to the combustion zone having sufficient length to allow substantially complete combustion of the fuel added by the spraybars prior to discharge through the nozzle with wide ranging flight speeds and Mach numbers.

Recent advances in flameholder design such as the trapped vortex cavity pilot disclosed in U.S. Pat. No. 8,011,188 issued Sep. 6, 2011, assigned to the assignee of the present invention and incorporated herein by reference in its entirely have been developed. In this design, ignition of fuel for the augmentor is provided by an ignition system formed in an annulus of the of the combustion liner. The annulus is a counterbore forming a cavity in the combustion liner extending 360° around the exhaust, having a forward wall and an aft wall. The cavity also includes an outer cavity wall positioned radially outward of the combustor line. As the cavity is a counterbore in the combustion liner. there is no wall forming a boundary with the exhaust gas flow. As used herein, the terms forward and aft are used to describe a position of a feature with respect to the engine, forward referring to features positioned more toward the front of the engine, aft refers to features positioned toward the engine exhaust, while radial positioning is described with reference to the engine centerline. The ignition system includes cooling holes and fuel injector tubes positioned to inject air and fuel into the cavity forming an air/fuel mixture. This air/fuel mixture is ignited by igniters operably positioned around the cavity. The specific design of the cooling holes determines the shape of a vortex within the cavity forming the pilot flame when ignited by the igniters. This pilot flame is then used to ignite air and fuel in the exhaust when the engine undergoes wet operation, that is, when augmentation is required. The open trapped vortex created within the cavity is in direct communication with the core flow.

Despite the above-described existing technology, there remains a need for an augmentor with a flame stabilization apparatus that has better performance characteristics than previous flame stabilization apparatus used to ignite afterburners or augmentors.

BRIEF DESCRIPTION OF THE INVENTION

This need is addressed by an augmentor using a closed trapped vortex pilot structure.

According to one aspect of the technology described herein, a closed trapped vortex apparatus includes: a tubular structure having a structural wall, the structural wall forming a cavity within the tubular structure, the structural wall having a lower boundary wall forming a boundary between the cavity and a core flow passage; at least one driver hole passing through the structural wall; an ignition source communicating with the cavity; a fuel source communicating with the cavity; and a plurality of flame tubes extending through the lower boundary wall of the tubular structure at preselected locations so as to provide communication between the cavity and the core flow passage.

According to another aspect of the technology described herein, a gas turbine engine exhaust apparatus includes: an exhaust casing; a combustion liner spaced radially inward of the exhaust casing; a cooling duct defined by boundaries established radially inward by a first face of the combustion liner, and radially outward by the exhaust casing; a core duct defined by a second face of the combustion liner; and an augmentor apparatus, including: a radial spraybar radially extending into the core duct, the spraybar including fuel tubes in communication with a fuel source, the spraybar configured to introduce fuel into the core duct, a closed trapped vortex apparatus disposed within the cooling duct, the closed trapped vortex apparatus including: a tubular structure having a structural wall, the structural wall forming a cavity within the tubular structure, the structural wall having a lower boundary wall forming a boundary between the cavity and the core duct, at least one driver hole passing through the structural wall, an ignition source communicating with the cavity; a fuel source communicating with the cavity; and a plurality of flame tubes extending through the lower boundary wall of the tubular structure at preselected locations providing communication between the cavity and the core duct; wherein the closed trapped vortex cavity apparatus of the augmentor apparatus is located radially outward of the combustor liner.

According to another aspect of the technology described herein, a method of providing pilot ignition for a gas turbine engine augmentor includes: passing a core flow containing oxygen through a core duct; introducing fuel into the core flow to define a combustible mixture; maintaining a pilot flame in a closed trapped vortex combustion pattern at a location outside the core duct; communicating the pilot flame from the closed trapped vortex to the core flow at one or more discrete locations around the periphery of the core duct, so as to ignite the combustible mixture.

BRIEF DESCRIPTION OF THE DRAWINGS

The invention may be best understood by reference to the following description taken in conjunction with the accompanying drawing figures in which.

DETAILED DESCRIPTION OF THE INVENTION

A turbofan gas turbine engine for powering an aircraft includes a longitudinal or axial centerline axis and has a fan section forward of the core engine. The core engine includes in serial downstream flow communication, a multistage axial compressor, an annular combustor and a high pressure turbine joined to the high pressure compressor by a high pressure drive shaft. Downstream of the core engine is a multistage low pressure turbine joined to the fan section by a low pressure drive shaft. The core engine is contained within a core engine casing and an annular bypass duct provides a bypass flowpath circumscribed about the core engine. An engine casing circumscribes the bypass duct which extends from the fan section downstream past the low pressure turbine and adjacent to the exhaust section. The annular bypass duct may be defined by a combustion liner, forming the boundary for hot gas flow in the core flow, and an exhaust liner located radially outward of the combustion liner and radially inward of the engine casing, the exhaust liner extending parallel and radially outward from the combustion liner.

Engine air enters the engine through the engine inlet and is initially pressurized as it flows downstream through the fan section win an inner portion referred to as a core engine air flow flowing through the compressor. An outer portion of the engine air referred to as bypass air is directed to bypass the core engine and flow through the bypass duct. The core engine air is suitably mixed with fuel by the main combustor fuel injectors and carburetors in the combustor. The fuel/air mixture is ignited, generating hot combustion gases which flow through the high pressure and low pressure turbines. The hot combustor gases, after passing through the turbines, are discharged into the exhaust section of the engine through an annular core outlet as core gases into a core stream flowpath, which is an upstream portion of an the exhaust flowpath extending downstream and aft of the turbines, through a diffuser which is aft and downstream of the turbines in the engine. The core stream flowpath is located radially inward of the bypass duct within the combustion liner.

The diffuser includes a diffuser duct circumscribed by an annular radially outer diffuser liner and is used to decrease the velocity of the core gases as they enter the augmentor or afterburner section of the engine. The augmentor or afterburner section of the engine is located radially within the combustor liner and downstream of the diffuser. The centerline axis of the engine is also the centerline axis of the augmentor or afterburner section of the engine which is radially disposed around the engine centerline axis. A converging center body extending aft from the core outlet and partially into the augmentor section radially inwardly bounds the diffuser duct. The diffuser is axially spaced apart upstream or forward of a forward end of the combustor liner. A combustion zone for the augmentor section in the exhaust flowpath is surrounded by the combustion liner and located radially inward from the bypass duct and downstream and aft of the augmentor section.

Exhaust vanes extend radially across the exhaust flow path and are in communication with the cooling duct. The exhaust vanes are typically hollow and curved. The hollow exhaust vanes are designed to receive a first portion of bypass air from the cooling duct and inject it into the core flow through air injection holes in the exhaust vanes. This air and core gases mix forward of the augmentor section to form the exhaust flow. The exhaust section includes an annular exhaust casing disposed co-axially with and suitably attached to the corresponding engine casing and surrounding the exhaust flowpath. Mounted to the aft end of the exhaust casing is a variable area converging/diverging exhaust nozzle through which the exhaust flow is discharged during engine operation.

The exhaust section further includes the combustion liner spaced radially inward from the exhaust casing, as previously described, defining the annular cooling duct through which the bypass or cooling air flows. The exhaust combustion zone within the core flow is located radially inward of the combustion liner aft of the turbine section of the engine. The augmentor section includes a plurality of circumferentially spaced apart radial flameholders extending radially inwardly from a diffuser liner into the exhaust flowpath. Each of the radial flameholders includes an integral spraybar. The radial flameholders are circumferentially integrated with radial spraybars, there being one radial spraybar between each circumferentially adjacent pair of the radial flameholders.

The integral spraybars in each of the radial flameholders of the augmentor section includes one or more fuel tubes. The fuel tubes are joined in flow communication with a fuel supply which is effective for channeling fuel to each of the fuel tubes for injection the fuel into the core flow aft or downstream of the exhaust vanes through which bypass air is injected into the core flow and upstream or forward of the combustion zone. Each of the radial flameholders includes a flameholder heat shield surrounding the fuel tubes. Fuel holes in the fuel tubes are operable for injecting fuel through the heat shield openings in the flameholder heat shield and into the core flow. A generally aft and downstream facing flameholding wall having a flat outer surface includes film cooling holes and is located on an aft end of the flameholder heat shield. The radial flameholders are swept downstream from radially outer ends toward radially inner ends of the radial flameholders. The flameholding wall and the flat outer surface are canted about a wall axis that is angled with respect to the centerline axis of the engine.

The radial fuel spray bars of the augmentor are circumferentially disposed between the radial flameholders. The augmentor is illustrated herein with one radial spray bar between each circumferentially adjacent pair of radial flameholders. Other embodiments of an augmentor or afterburner may employ fewer radial spraybars in which some of the adjacent pairs of the radial flameholders have no radial spraybar therebetween and others of the adjacent pairs of radial flameholders at least one radial spraybar therebetween.

Each of the radial spraybars includes a spraybar heat shield surrounding one or more fuel tubes. The radial spraybars may have one or more fuel tubes. Fuel holes in the fuel tubes inject fuel through openings in the spraybar heat shields into the core flow.

As previously noted, bypass air is mixed into the core flow. The augmentor uses the oxygen from this bypass air for combustion when fuel is added to the core flow. The description of the augmentor in the engine is well-known in the art and is described in further detail in U.S. Pat. No. 8,011,188 issued Sep. 6, 2011, assigned to the assignee of the present invention and incorporated herein by reference in its entirety. The reference patent utilizes a trapped vortex cavity pilot to ignite the fuel-air mixture in the core flow.

Figure 1:
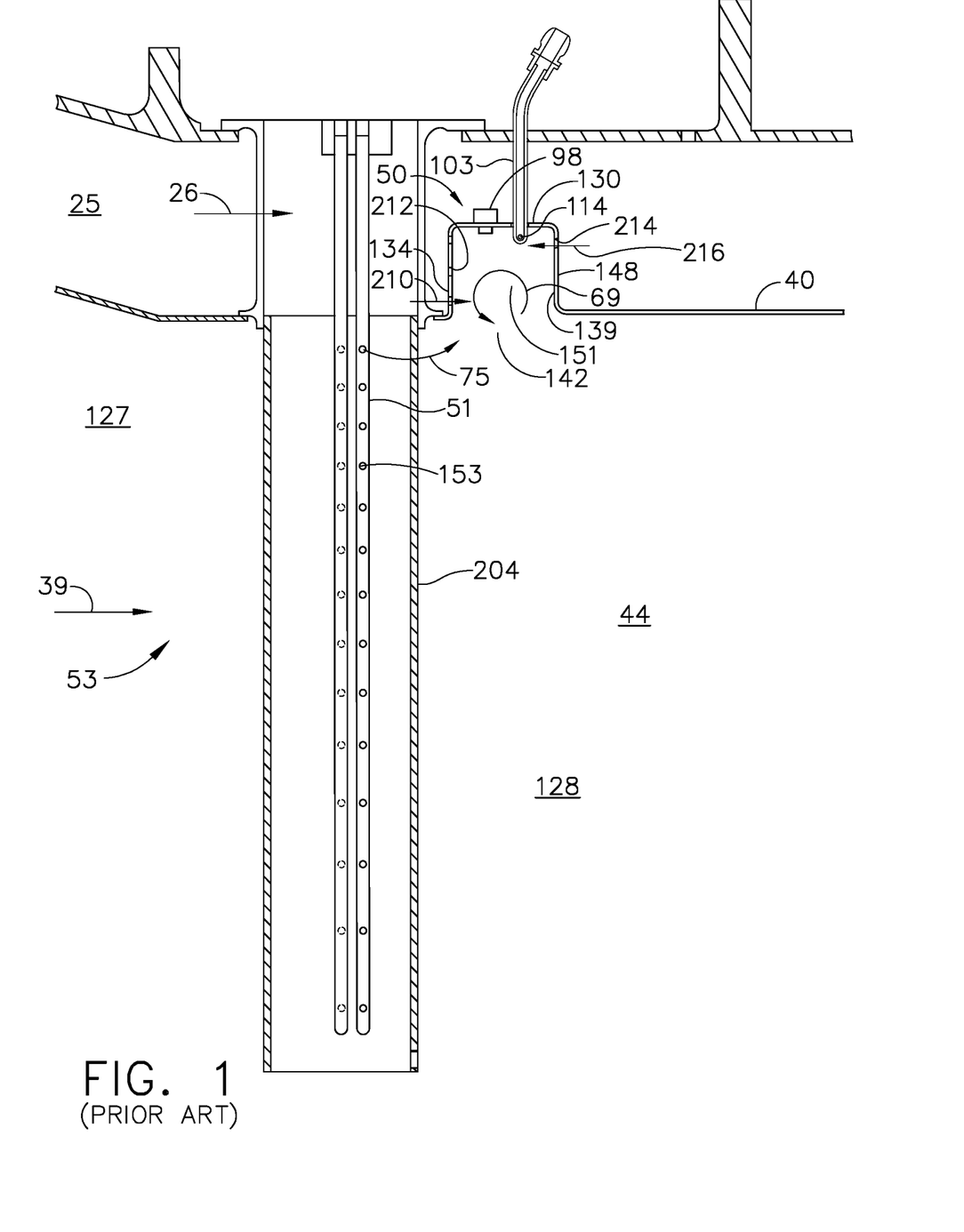
FIG. 1 is a cross sectional view of an exhaust system that includes an augmentor using a prior art open trapped vortex pilot design.

FIG. 1 is a prior art illustration of a trapped vortex cavity pilot utilized to light the air-fuel mixture. In FIG. 1 core flow 39 includes bypass air added from the annular cooling duct 25. Also depicted in FIG. 1 is a radial spraybar 53 extending into the core flow 39. Fuel tubes 51 extend into spray bar 53, fuel tubes 51 being in fluid communication with a source of fuel, not shown. Spraybar heat shields 204 are positioned around spray bar 53. When wet operation is required, fuel is injected through fuel holes modifying core flow at position 128. This air-fuel mixture is ignited by vortex 69 trapped in trapped vortex cavity pilot 50.

The trapped vortex cavity pilot 50 is formed in combustor liner 40, having a fore wall 134, an aft wall 148 and an outer wall 130, the walls forming part of the boundary of the combustion liner 40 and defining a cavity 151 extending circumferentially around combustion liner 40. Cavity 151 forms a gutter extending around the combustion liner in the engine exhaust. Air is injected into the cavity through air injection holes 210, 212, 214, 216, while fuel is injected during wet operation from a fuel supply, not shown, through vortex cavity spraybar 103 and mixed with the air. The air/fuel mixture is ignited during wet operation by igniter 98 creating a ring of flame in the cavity. The vortex is trapped in cavity 151 and when ignited, creates a ring of fire around the combustion liner, the vortex lighting the air-fuel mixture in modified core flow creating a combustion zone 44 providing the additional thrust. Cavity 151 includes a cavity opening 142 exposing the walls of the combustion liner forming the interior of the cavity to core gas flow as well as to any incident radiation that may enter the engine through the exhaust. Also as may be evident, when the engine is not engaged in wet operation, cavity 151 is constantly exposed to core flow.

Figure 2:
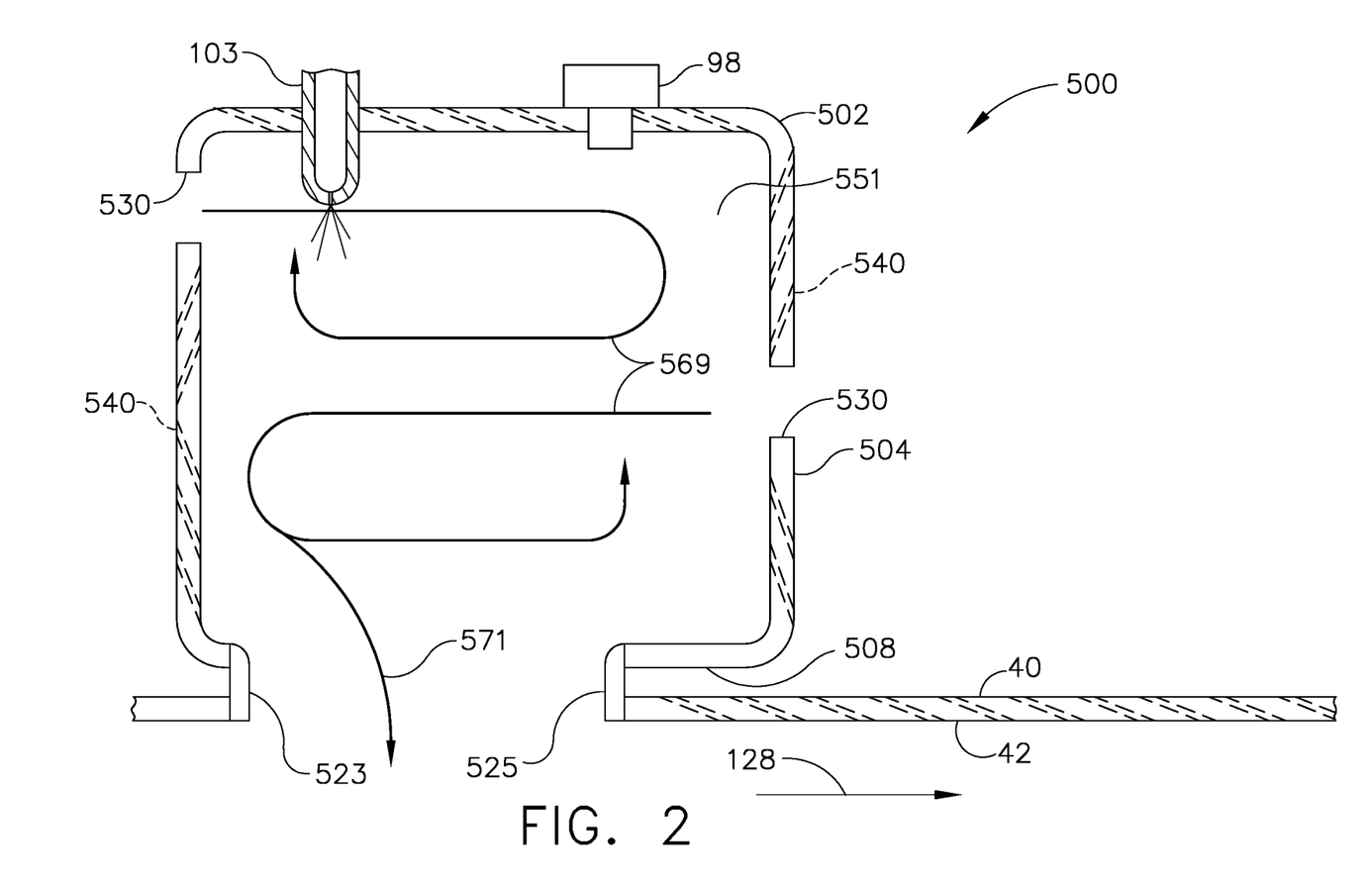
FIG. 2 is a cross-sectional view of an exemplary closed trapped vortex structure.

The technology described herein operates with a conventional augmentor section having spray bars such as described above as well as other spray bar designs to ignite a fuel-air mixture introduced into core flow 39 producing a combustion zone, resulting in wet operation and providing the aircraft with on-demand thrust. A cross sectional representation of a closed trapped vortex cavity structure 500 at an opening 525 of a flame tube 523 showing a vortex 569 is depicted in FIG. 2. The closed trapped vortex cavity structure 500 comprises a tubular structure 502 positioned radially outward from combustion liner 40. Although shown in an exemplary embodiment as having a substantially square cross-section, the geometry of closed trapped vortex cavity structure 500 is not so limited, as it may also have, for example, a circular geometry, a rectangular geometry, an oval geometry or other geometries. The geometry selection ultimately will be decided based on considerations as to fabrication of closed tubular structure 502 and stability of vortex 569 within closed tubular structure.

The tubular structure 502 of preselected geometry forming closed trapped vortex cavity structure 500 is defined by a structural wall 504 forming the preselected geometry.

There are various penetrations within the otherwise continuous wall 504. At least one driver hole 530 penetrates wall 504 providing communication between the exterior of closed trapped vortex cavity structure and the cavity 551, which is the interior of tubular structure 502. In FIG. 2. two driver holes 530 are depicted. Driver holes 530 determine the shape of vortex 569, and the number, position, size and shape of driver holes 530 are preselected and varied to achieve a stable vortex having a preselected shape. In the illustrated example, the vortex 569 is configured as two individual vortices rotating in opposite directions.

Structural wall 504 of tubular structure 502 includes a plurality of cooling holes 540 providing communication for cooling air between the exterior of closed trapped vortex cavity structure and the cavity 551. While the driver holes 530 determine the vortex structure, the cooling holes adding the cooling air have a significant effect on the vortex structure. Cooling hole size and shape are selected to reinforce the vortex pattern. For example, at least some of the cooling holes 540 can pass through the structural wall 504 at an acute angle to a surface of the structural wall. In FIG. 2, trapped vortex 569 is depicted as spaced from structural wall 504. This spacing would be the result of film cooling provided by cooling air through cooling holes 540.

FIG. 2 also depicts a penetration in structural wall 504 for a spraybar 103 dedicated to closed trapped vortex cavity structure 500. Alternatively, other fuel sources may be provided, such as a simple orifice communicating with the structural wall 504. FIG. 2 also depicts a penetration in structural wall 504 for an igniter 98, also dedicated to structure 500. Alternatively, other ignition sources may be placed in communication with the cavity 551. For example, a source of heated gas or of flame from a pilot burner (not shown) could be used in place of the igniter 98. In wet operation, fuel is metered into cavity 551 by trapped vortex spraybar 103 and ignited by igniter 98, creating flame in the shape of vortex 569. Fuel may be metered in through apertures in spraybar 103, through fuel atomization or by any other technique. Also shown is an opening 525 through a flame tube 523 in lower boundary wall 508 of closed trapped vortex cavity structure 500 providing communication between cavity 551 and core flow 39, 128. In wet operation, when the vortex is ignited, a portion of the flame 571 or hot gas (i.e. combustion products) extends through opening 525 in flame tube 523, allowing the flame to act as a pilot to ignite air-fuel mixture in the modified core flow 128 igniting combustion zone 44 during wet operation. A flame tube penetrating lower boundary wall 508 and extending through liner 40 providing communication between cavity 551 and modified core flow as well as an igniter and a spraybar are positioned radially in closed trapped vortex cavity structure opposite radial spray bars 53 of the augmentor. In an alternative construction, a portion of the liner 40 could define the lower boundary wall. The number of flame tubes 523, trapped vortex cavity spray bars 103 and igniters utilized in closed trapped vortex cavity structure 500 is a function of required operability and performance of the augmentor.

Figure 3:
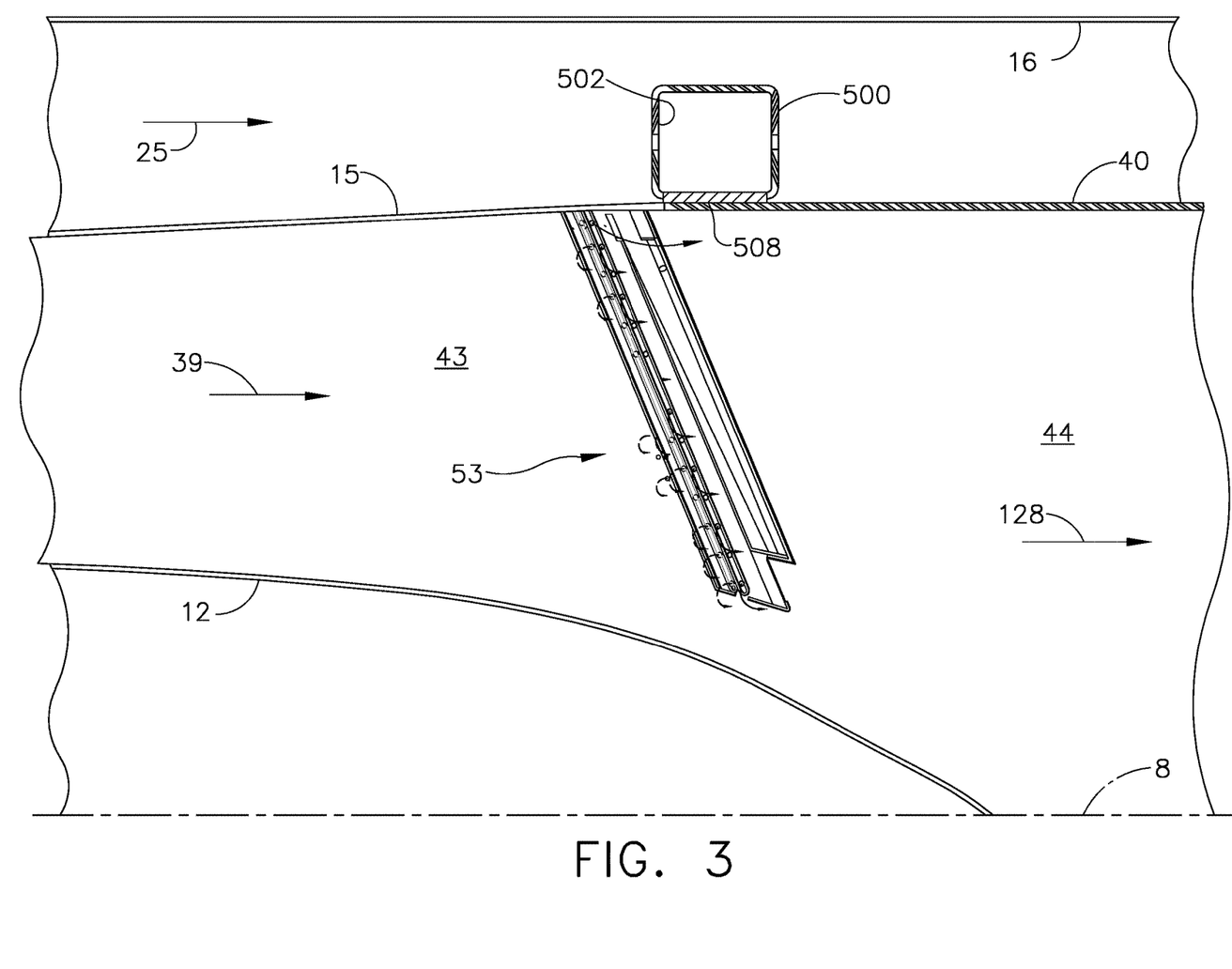
FIG. 3 depicts a cross section of an engine exhaust having an augmentor and utilizing a closed trapped vortex cavity structure.

FIG. 3 depicts a cross section of an exhaust system showing trapped vortex cavity structure 500 assembled adjacent combustor liner 40 in annular cooling duct 25, annular cooling duct 25 defined by diffuser liner 15 and combustion liner 40 on the radially inward side of the duct and exhaust casing 16. Cooling air supplied by the fan by-passes the engine core in cooling duct 25. As can be seen in the cross section depicted in FIG. 3, trapped vortex cavity structure 500 is positioned within annular cooling duct 25 and radially outward of combustion liner 40. Air for both driver hole 530 and cooling holes 540 in structural wall 504 is sourced from cooling air flowing in annular cooling duct 25. As is clear from FIGS. 2 and 3, closed trapped vortex cavity structure 500 is behind combustion liner 40 and only has communication through combustion liner 40 where flame tubes 523 penetrate the lower boundary wall 508 of structural wall 504. With the exception of flame tube penetrations, lower boundary wall 508 is continuous.

Alternatively, flame tubes 523 may be a separate structure such as a CMC composite, including but not limited to an Ox-Ox ply construction. When the flame tube 523 is constructed as a separate structure, it is attached to closed trapped vortex cavity structure so as to be an integral part of the closed trapped vortex cavity structure 500.

Also depicted in FIG. 3 is a radial spray bar 53. A plurality of radial spray bars 53 are positioned radially within the core flow. The number of radial spray bars depends on the size of the engine and the performance required by the augmentor. Also depicted in FIG. 3 is a centerbody 12, which extends across the engine centerline 8. The centerbody forms an inner boundary for core flow. Collectively, the diffuser duct 15, the combustion liner 40, and the centerbody 12 define a core duct 43 for core flow 39 and modified core flow 128.

Figure 4:
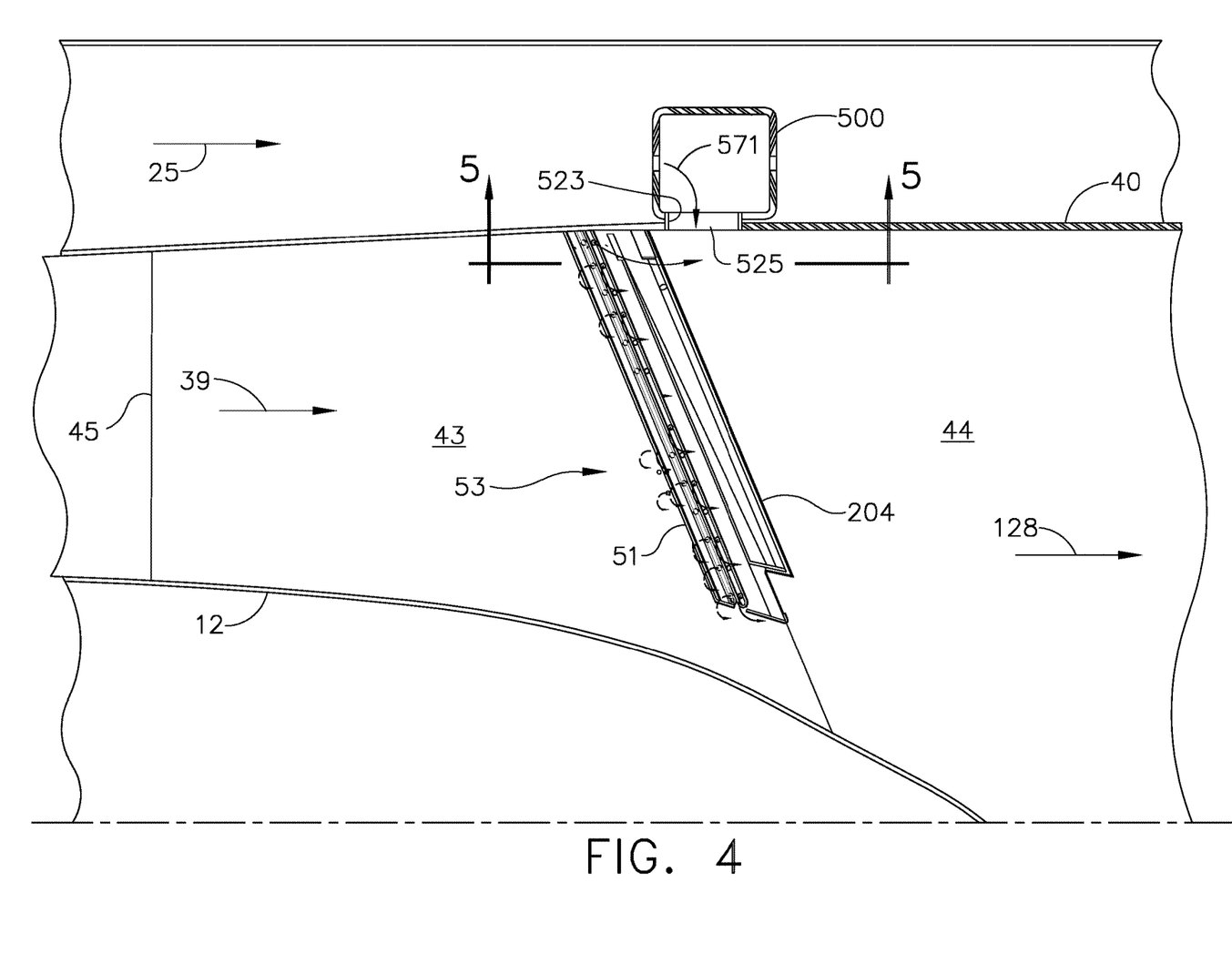
FIG. 4 depicts a cross section of an engine exhaust having an augmentor and utilizing a closed trapped vortex cavity structure, the cross-section taken through a flame tube of the closed trapped vortex cavity structure.

FIG. 4 is similar to FIG. 3, the closed trapped vortex cavity structure 500 being identical to that shown in FIG. 3, the details of closed trapped vortex cavity structure 500 being depicted in FIG. 2. In FIG. 4, an exhaust vane 45 extends into core flow 39, Exhaust vane 45 may be hollow and disposed in fluid communication with cooling air from annular cooling duct 25. The exhaust vane 45 may include injection holes configured for injecting a portion of the cooling air into core flow 39. In wet operation. fuel from fuel tubes 51 in radial spray bars is injected into core stream 39 resulting in a modified core flow 128. Pilot flame from closed vortex cavity structure 500 projects through flame tube opening 525 lighting the fuel-air mixture in modified core flow producing combustion zone 44. Also shown in FIG. 4 is spraybar heat shield 204. Although only a heat shield is shown aft of spraybar 53, additional spraybar heat shields 204 may be included fore and/or laterally of spraybar 53. Heat shield not only provides thermal protection to spraybar 53, but also may act as a bluff body slowing down the velocity of gases flowing past the spraybar in the core flow. This reduction in velocity allows a flame lit by pilot flame 571 projecting through flame tube opening 525 to propagate down the bluff body.

As should be clear from FIGS. 2-4, except where flame tubes 523 penetrate the lower boundary wall 508 of tubular structure 502 and combustion liner 40, vortex 569 is confined within tubular structure 502 and is not subject to the vagaries of core flow. Closed trapped vortex cavity structure 500 may be secured to the combustion liner 40 by any convenient means. Preferably, support may be provided by the flame tubes where the flame tubes 523 penetrate combustion liner 40. Alternatively, trapped vortex cavity structure 500 may be brazed to combustion liner 40, or structure 500 may be suspended from exhaust casing 16. In one embodiment, the side of combustion liner 40 opposite core flow 128 may form lower boundary wall 508 of tubular structure 502.

Figure 5:
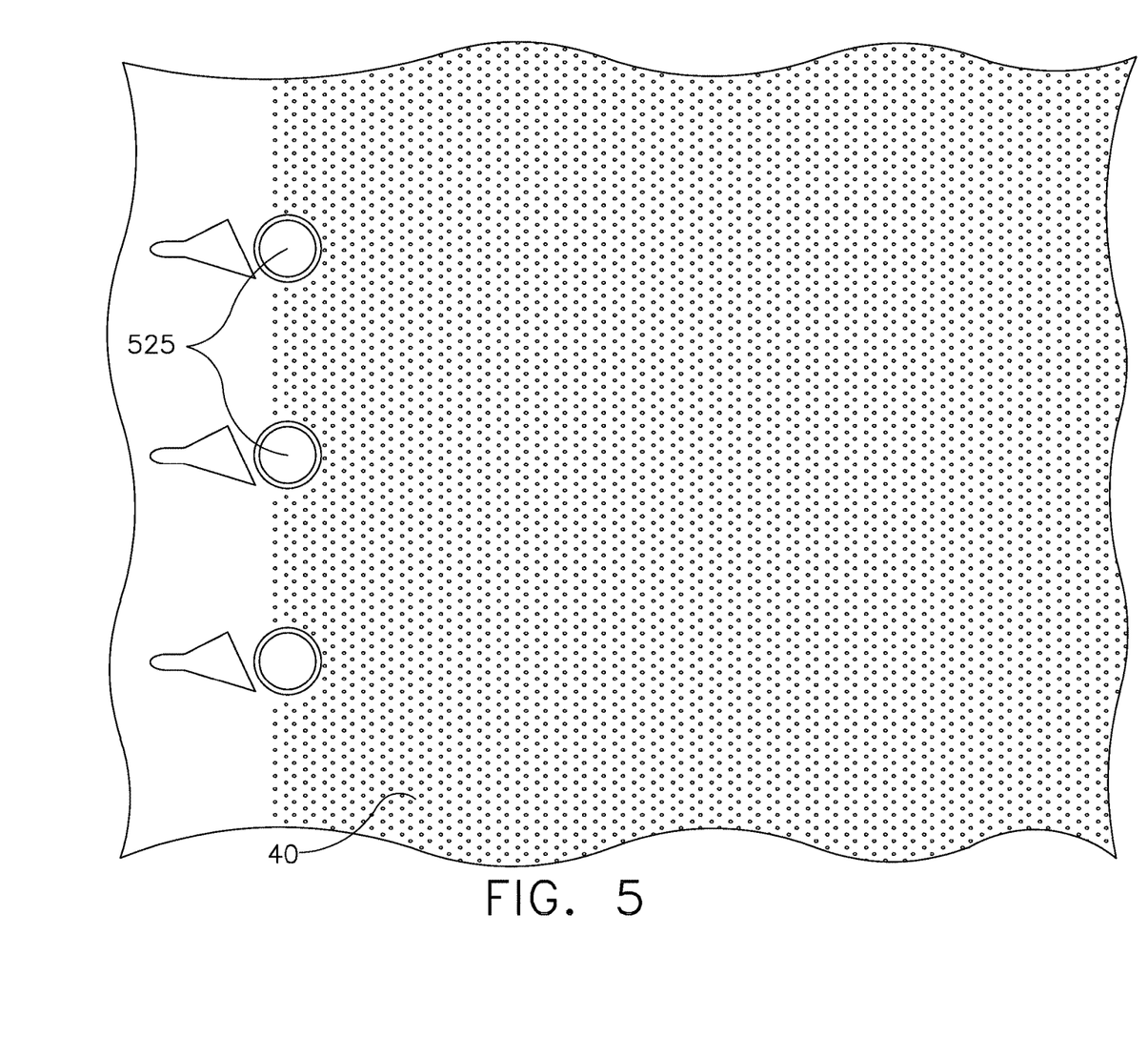
FIG. 5 is a circumferential cross section through a lower boundary wall of the tubular structure of the closed trapped vortex cavity structure of FIG. 3 showing a first example of a flame tube geometry cross section.
Figure 6:
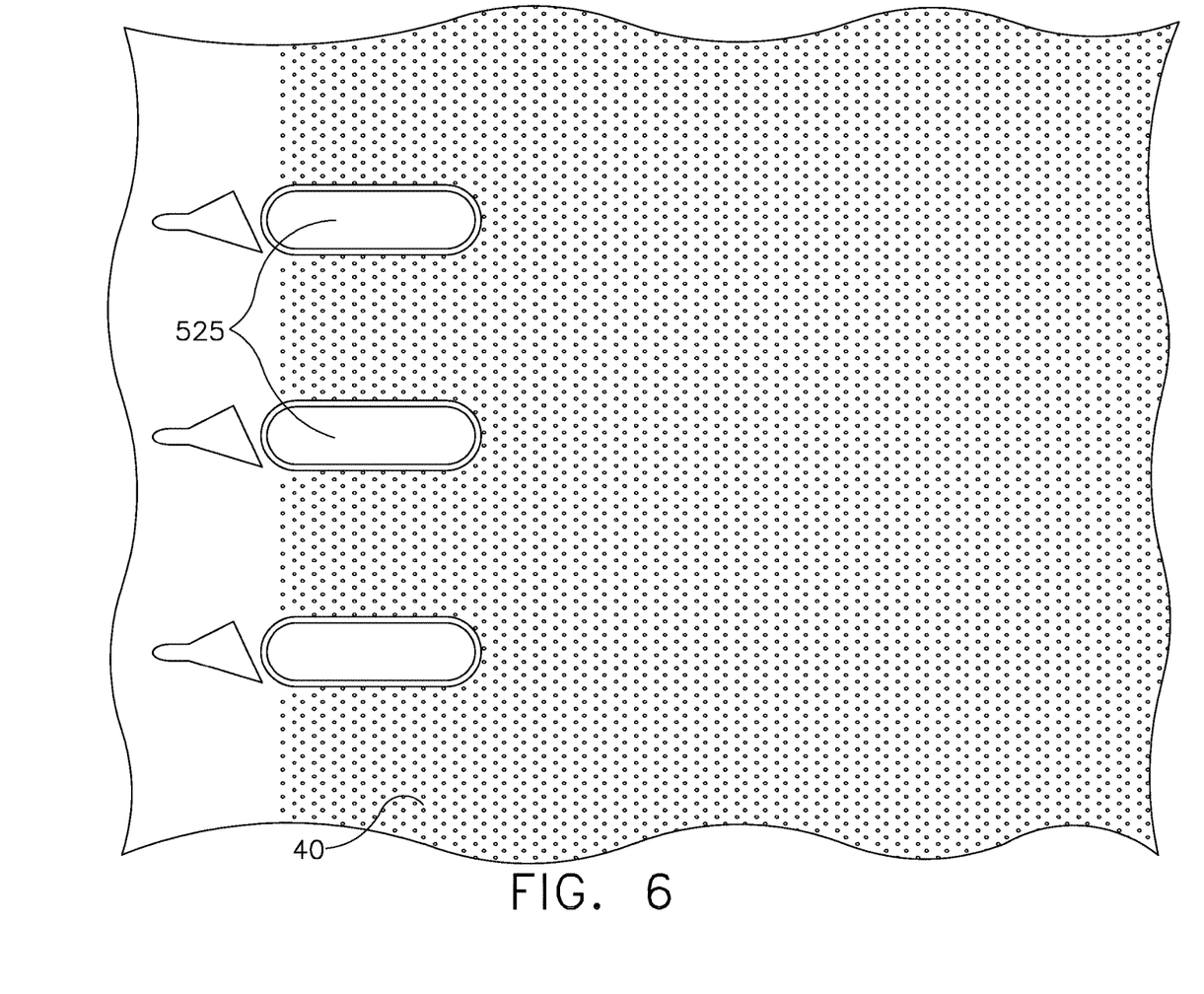
FIG. 6 is a circumferential cross section through a lower boundary wall of the tubular structure of the closed trapped vortex cavity structure of FIG. 3 showing an alternative configuration of a flame tube geometry section.
Figure 7:
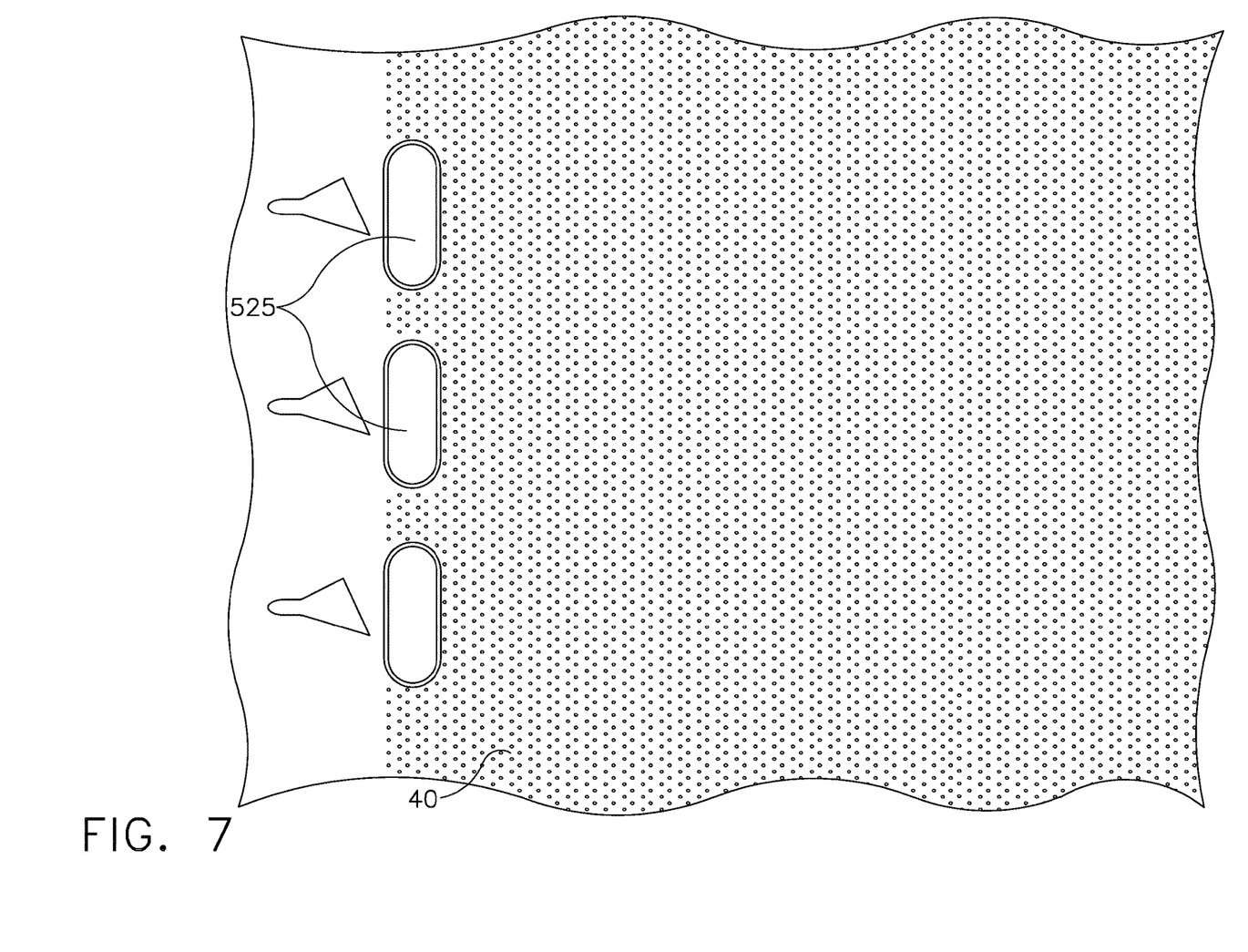
FIG. 7 is a circumferential cross section through a lower boundary wall of the tubular structure of the closed trapped vortex cavity structure showing another alternative third example of a flame tube configuration.

FIGS. 5-7 are cross-sectional views of the lower boundary wall structure 508 viewed from annular cooling duct through combustion liner 40 showing the shape of flame tube openings 525. As is demonstrated in the figures, the shape and orientation of flame tube openings 525 may be varied. For example, the flame tube openings 525 maybe circular as seen in FIG. 5. As another example, they may be in the shape of elongated slots. FIG. 6 shows an example where the flame tube openings 525 have an elongated "racetrack" shape extending an axial direction, and FIG. 7 shows an example where the flame tube openings 525 of elongated racetrack shape extending in a circumferential or tangential direction. The size of flame tube openings 525 must be sufficiently large for a pilot flame or hot gases (i.e. combustion products) to project through it into the core flow, but must otherwise be as small as possible.

Figure 8:
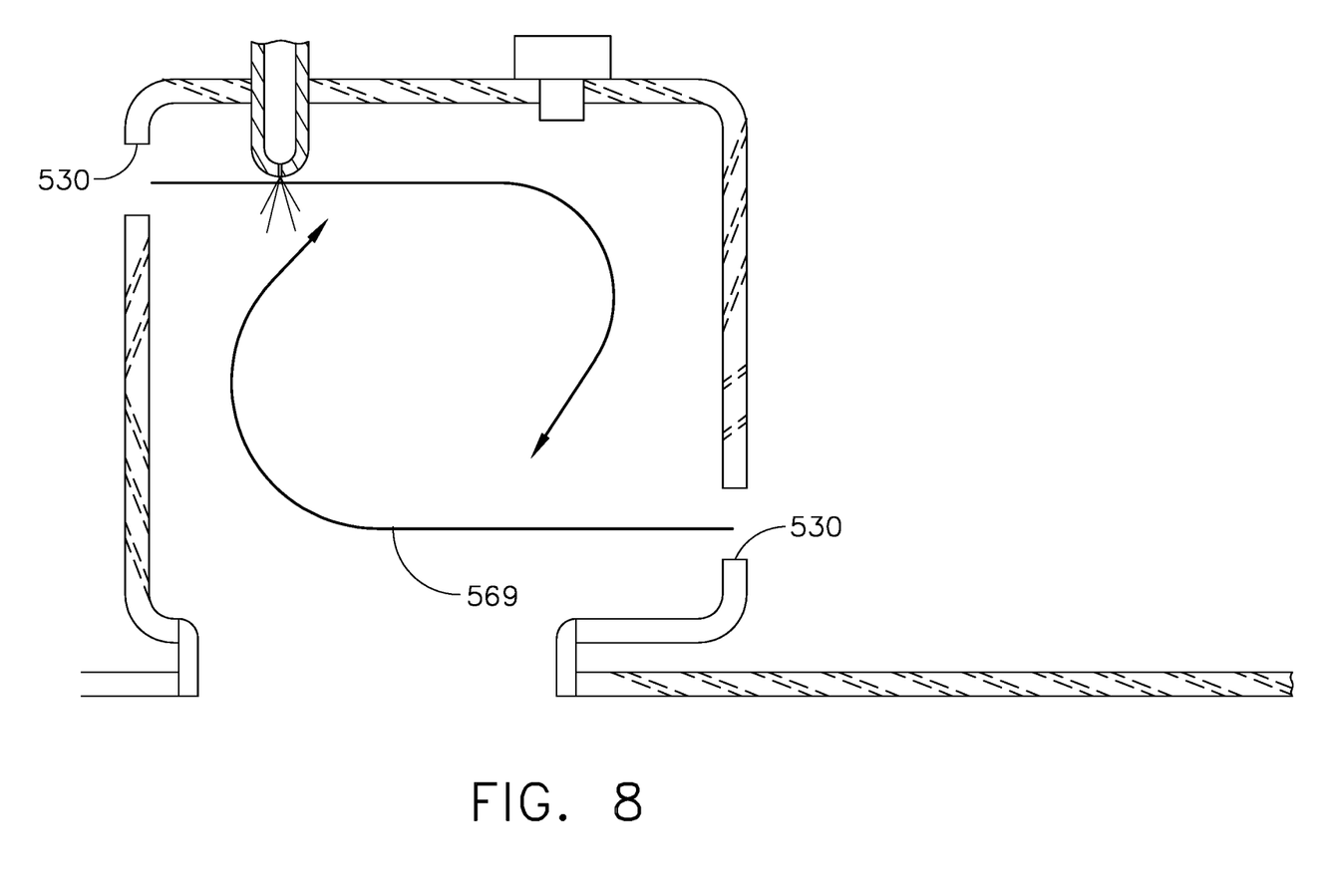
FIG. 8 is a cross sectional view of an alternative configuration of the closed vortex structure, showing the effect of driver hole position on vortex shape.

FIG. 8 demonstrates an alternative embodiment of the closed trapped vortex cavity structure 500. As shown in FIG. 8, the location of driver holes 530 in structural wall 504 of closed trapped vortex cavity structure 500 determines the shape of vortex 569. Driver holes 530 at different positions and having different sizes permit customization of vortex 569 to a preselected shape. In the illustrated example, the vortex 569 is configured as a single large vortex within the cavity. The features in FIG. 8 are otherwise identical to those shown in FIG. 2.

An advantage of the trapped vortex cavity structure described herein is that it is a structure that is separate from the combustion liner. The trapped vortex cavity structure can be located radially outward from the combustion liner. Only discrete flame tubes positioned aft of the augmentor spray bars penetrate the combustor liner, providing communication between the trapped vortex cavity structure in the core flow.

Another advantage of the closed trapped vortex cavity structure described herein, compared to other pilots for ignition sources such as open trapped vortex cavities, is that provides a more stable flame and is thus a more stable ignition source because of vortex is formed in a closed cavity. When the vortex is ignited to form a flame it is shielded from the core flow except at the discrete locations of the flame tubes. It is protected from any disruptions due to variations in core flow.

Because the trapped vortex cavity structure is positioned so that is substantially located within the cooling duct, with the exception of flame tubes, it is easier to cool, particularly when the engine is in dry operation. The cooler operating conditions should result in a longer life of the components comprising the trapped vortex cavity structure.

The foregoing has described a closed trapped vortex apparatus and method for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A closed trapped vortex apparatus, comprising:
a tubular structure having a structural wall, the structural wall forming a cavity within the tubular structure, the structural wall having a lower boundary wall forming a boundary between the cavity and a core flow passage;
at least one driver hole passing through the structural wall;
an ignition source communicating with the cavity;
a fuel source communicating with the cavity;
a plurality of flame tubes extending through the lower boundary wall of the tubular structure at a plurality of preselected discrete locations so as to provide communication between the cavity and the core flow passage; and
wherein the closed trapped vortex apparatus is configured to form a vortex confined within the tubular structure.

2. The apparatus of claim 1 further comprising a plurality of cooling holes formed in the structural wall, the plurality of cooling holes passing through the structural wall at an acute angle to a surface of the structural wall.

3. The apparatus of claim 1 wherein the ignition source comprises an igniter extending through the structural wall into the cavity.

4. The apparatus of claim 1 wherein the fuel source comprises a spraybar extending through the structural wall into the cavity.

5. The apparatus of claim 1 wherein the tubular structure extends at least partially around the core flow passage.

6. The apparatus of claim 1 wherein the tubular structure extends 360° around the core flow passage.

7. The apparatus of claim 1 wherein the plurality of flame tubes are configured as elongated slots.

8. A gas turbine engine exhaust apparatus, comprising:
an exhaust casing;
a combustion liner spaced radially inward of the exhaust casing;
a cooling duct defined by boundaries established radially inward by a first face of the combustion liner, and radially outward by the exhaust casing;
a core duct defined at least in part by a second face of the combustion liner; and
an augmentor apparatus, including:
a radial spraybar radially extending into the core duct, the radial spraybar including fuel tubes in communication with a fuel source, the spraybar configured to introduce fuel into the core duct,
a closed trapped vortex apparatus disposed within the cooling duct, the closed trapped vortex apparatus comprising:
a tubular structure having a structural wall, the structural wall forming a cavity within the tubular structure, the structural wall having a lower boundary wall forming a boundary between the cavity and the core duct,
at least one driver hole passing through the structural wall,
an ignition source communicating with the cavity;
a fuel source communicating with the cavity; and
a plurality of flame tubes extending through the lower boundary wall of the tubular structure at a plurality of preselected discrete locations providing communication between the cavity and the core duct;
wherein the closed trapped vortex apparatus of the augmentor apparatus is located radially outward of a combustor liner.

9. The apparatus of claim 8 further comprising a plurality of cooling holes formed in the structural wall, the plurality of cooling holes passing through the structural wall at an acute angle to a surface of the structural wall.

10. The apparatus of claim 8 wherein the ignition source comprises an igniter extending through the structural wall into the cavity.

11. The apparatus of claim 8 wherein the fuel source comprises a spraybar extending through the structural wall into the cavity.

12. The apparatus of claim 8 further comprising:
a diffuser liner spaced radially inward of the exhaust casing and upstream of the combustion liner, the diffuser liner having a first face cooperating with the combustion liner to define the core duct, and an opposed second face defining a portion of the cooling duct; and
a hollow exhaust vane radially extending into the core duct from the diffuser liner, wherein the hollow exhaust vane is in fluid communication with the cooling duct and includes injection holes configured to inject air into the core duct.

13. The apparatus of claim 8 wherein the tubular structure extends at least partially around a core flow radially outward of the combustion liner.

14. The apparatus of claim 8 wherein the tubular structure extends 360° around a core flow radially outward of the combustion liner.

15. The apparatus of claim 8 wherein the plurality of flame tubes are configured as elongated slots.

16. A method of providing pilot ignition for a gas turbine engine augmentor, comprising:
passing a core flow containing oxygen through a core duct;
introducing fuel into the core flow to define a combustible mixture;
maintaining a pilot flame in a closed trapped vortex combustion pattern at a location outside the core duct; and
communicating at least one of the pilot flame and hot gases from the closed trapped vortex combustion pattern to the core flow through a plurality of flame tubes at a plurality of preselected discrete locations around a periphery of the core duct, so as to ignite the combustible mixture.

17. The method of claim 16 wherein the closed trapped vortex combustion pattern comprises a single vortex.

18. The method of claim 16 wherein the closed trapped vortex combustion pattern comprises two or more vortices.

19. The method of claim 16 wherein the fuel is introduced into the core flow through a radial spray bar disposed upstream of a radial flameholder, wherein the radial spray bar and the radial flame holder are disposed upstream of the pilot flame.

\* \* \* \* \*